Figure 1:
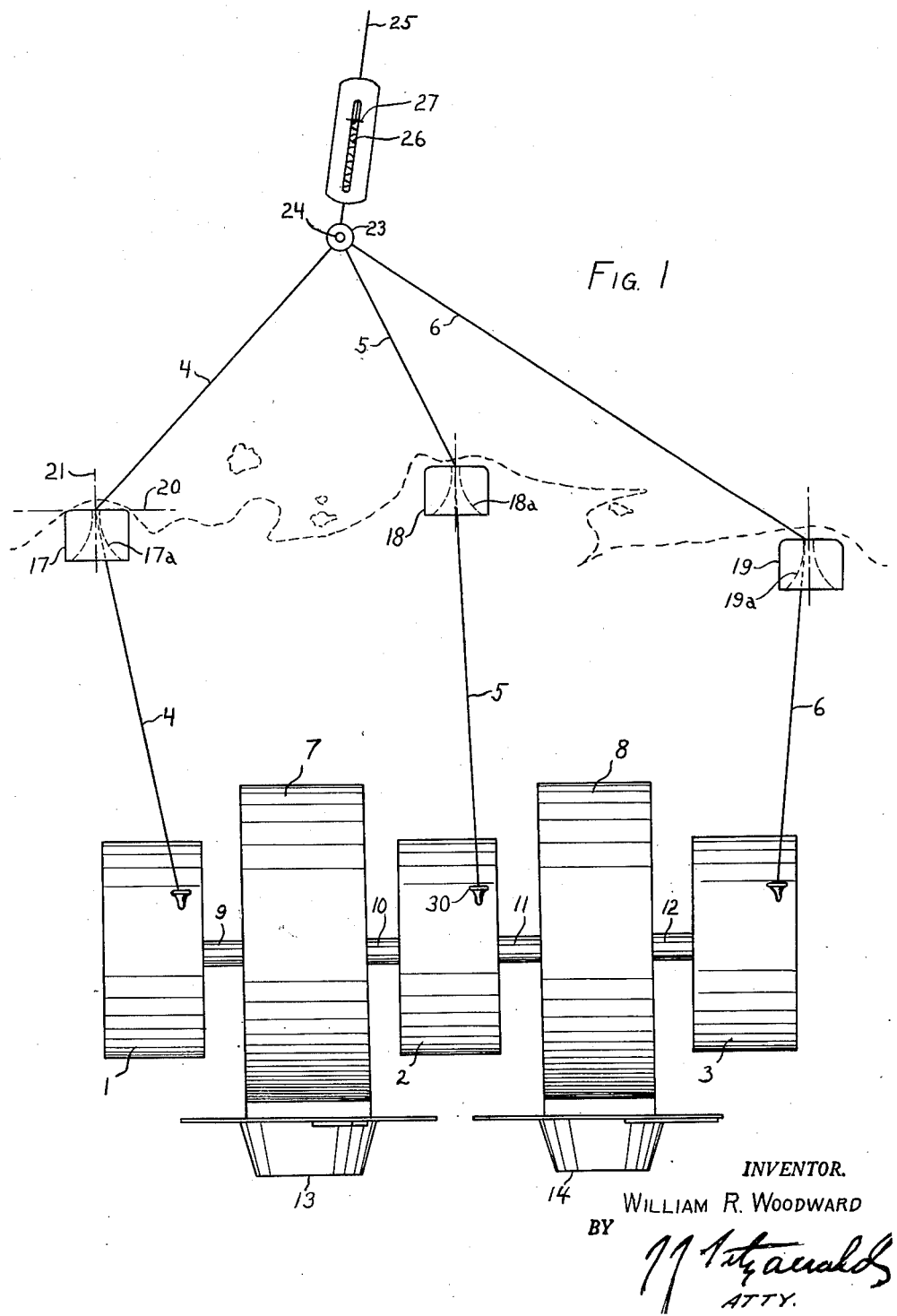

July 29, 1952 W. R. WOODWARD 2,604,704
HYPERBOLIC POSITION-PLOTTING INSTRUMENT
Filed Nov. 24, 1943 3 Sheets-Sheet 1

INVENTOR.
WILLIAM R. WOODWARD
BY
ATTY.

July 29, 1952 W. R. WOODWARD 2,604,704
HYPERBOLIC POSITION-PLOTTING INSTRUMENT
Filed Nov. 24, 1943 3 Sheets-Sheet 2

INVENTOR.
WILLIAM R. WOODWARD
BY
ATTY

July 29, 1952      W. R. WOODWARD      2,604,704
HYPERBOLIC POSITION-PLOTTING INSTRUMENT
Filed Nov. 24, 1943      3 Sheets—Sheet 3
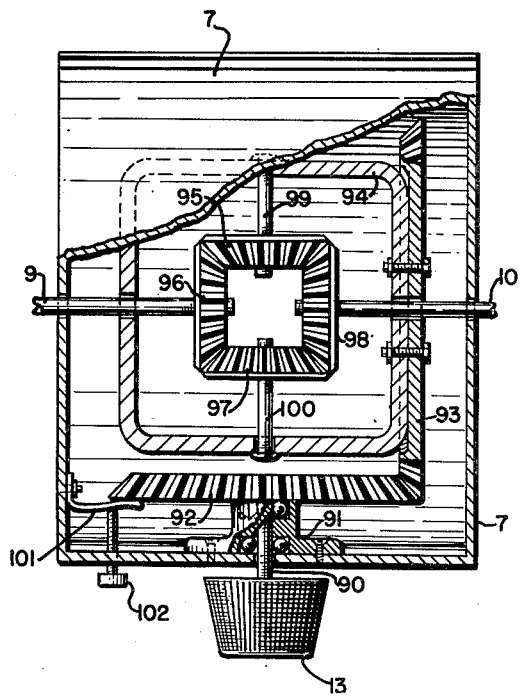
*INVENTOR.*
WILLIAM R. WOODWARD
BY
*ATTORNEY*

Patented July 29, 1952

2,604,704

UNITED STATES PATENT OFFICE 2,604,704

HYPERBOLIC POSITION-PLOTTING INSTRUMENT

William Redin Woodward, Cambridge, Mass., assignor, by mesne assignments, to the United States of America as represented by the Secretary of the Navy Application November 24, 1943, Serial No. 511,623

14 Claims. (Cl. 33—189)

This invention relates to a position-plotting instrument adapted to indicate the intersection of two hyperbolae having one common focus. More particularly the invention relates to plotting instruments adapted to determine position in connection with a radio system giving information determinative of the time difference in the arrival of synchronized signals from three different radio stations located at three different places. The term "synchronized" just used is intended to apply to recurrent signals transmitted in any fixed predetermined time relation.

If the relative time of transmission of signals from two stations of known location is known and the difference in time of reception of these two signals is measured, these data determine a hyperbola (assuming a plane earth) passing through the receiver and having the location of the stations as foci. If similar information is known about signals transmitted respectively from one of the aforesaid stations and a third station, another hyperbola is determined, and the intersection of these hyperbolae determines the location of the receiver. One convenient method of constructing hyperbolae was described by Van Schooten in his "Exercitationes Mathematicarum." Another method of constructing hyperbolae, somewhat less convenient for this purpose, was disclosed by Ziethen in U. S. Patent No. 639,488 of 1899. At the present time the practical art is still concerned with the making and the use of plotting devices which actually draw hyperbolic arcs, such as the Van Schooten device, or with devices which require additional information, such as the direction of arrival of signals, which may be difficult to determine with accuracy.

It is an object of this invention to provide a convenient and relatively compact apparatus for plotting the position determined by the intersection of the hyperbolae in substantially a single operation without the requirement of drawing intersecting hyperbolic arcs and without requiring direct measurement of the direction of arrival of signals. It is a further object of this invention to provide a plotting instrument adapted to utilize promptly and effectively the data obtained from the measurement of the difference in the time of arrival of synchronized signals from different radio stations.

If two strings, tied together at one end, are paid out at the same rate respectively from two fixed points, which may be set by suitable guides, and if the junction of the strings, moving over a plane including the said fixed points, is pulled away from such fixed points in such a manner as to keep both strings tight, the junction of the two strings will describe a hyperbola. The angle of the asymptotes of the hyperbola will be determined by the constant difference in length between the junction of the strings and the points from which the strings are paid out. In the plotting instrument of the present invention use is made of three strings having a common junction which may be paid out respectively from three reference points at a uniform rate. Means are also provided for adjusting the difference between the length of the various strings from the junction to the respective reference points. For any particular adjustment of these differences, a point is uniquely determined for which all three strings may be maintained tight and this point is the intersection of arcs of the two hyperbolae defined as aforesaid by adjacent pairs among the three strings.

Figure 2:
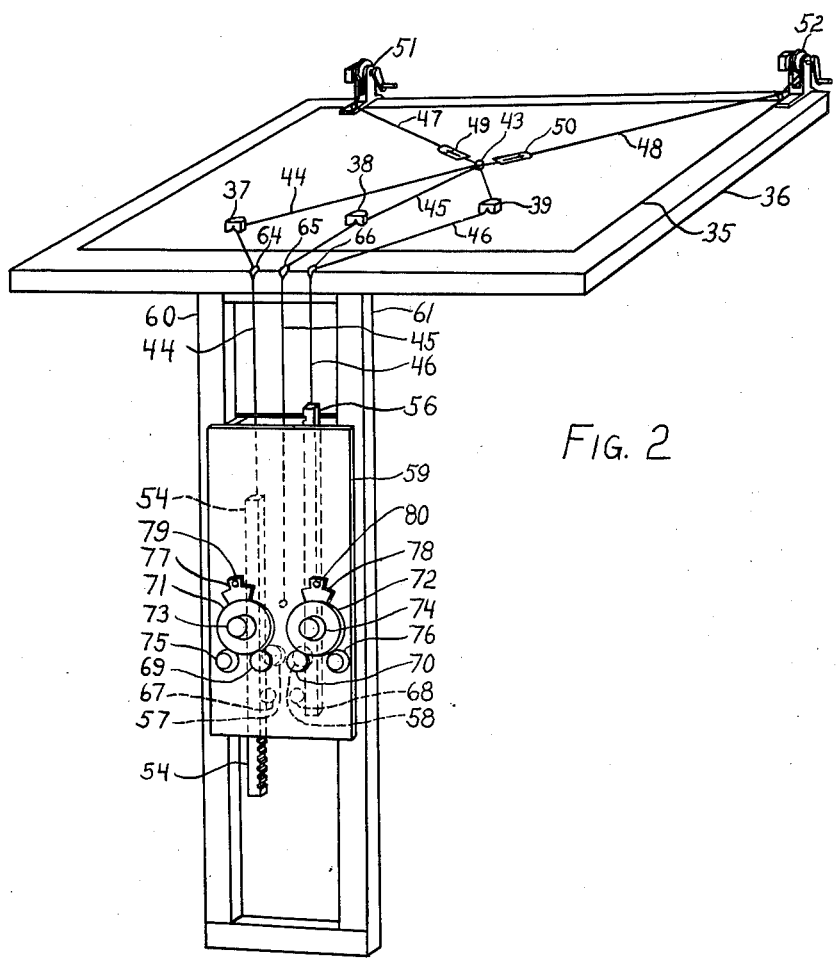

The invention may be more fully explained with reference to the drawings, in which Fig. 1 is a plan view illustrating one general form of instrument according to the invention; Fig. 2 is a perspective view of a modified form of instrument operating on the same essential principles as the instrument of Fig. 1; Fig. 3 is a partially sectioned view of a conventional differential of the type employed in the embodiment of Fig. 1; and Fig. 4 is an isometric view, partially in section, showing in detail the flanged eyelet of the apparatus shown in Figs. 1 and 2.

One general form of the apparatus of this invention is illustrated in Fig. 1. Housings 1, 2 and 3 enclose reels upon which are wound portions of the respective strings 4 and 5 and 6, which may be single or multiple strands of a suitable flexible and relatively non-stretching material. Even chains might be used if the links are sufficiently small and suitably articulated. The term "strand" is intended to include all such variations. Differential gear apparatus, which will presently be described, is represented at 7 and 8. The differential 7 is connected to the reel inside the housing 1 through the shaft 9 and to the reel inside the housing 2 by means of the shaft 10. The differential 8 is connected to the reel inside the housing 2 by means of the shaft 11 and to the reel inside the housing 3 by means of the shaft 12. For convenience the various reels will be identified by the reference number of their respective housings.

The differentials 7 and 8 are adapted to be controlled by knobs 13 and 14 respectively. These differentials may be of any of a number of well-known types, one of which is illustrated in Fig. 3, and should be adapted to provide gearing between the respective reels such as to permit the strings 4, 5 and 6 to be paid out at equal rates for any fixed position of the differentials. The knobs 13 and 14 are arranged to control the relative displacement between the various reels, thus being adapted to introduce adjustable fixed differences between the respective lengths of the strings paid out by the various reels.

The general arrangement of a conventional differential system of the type represented by 7 and 8 of Fig. 1 is shown in Fig. 3, similar reference numerals being used as associated with differential 7. The apparatus includes the generally cylindrical housing 7, within which the gearing apparatus is mounted. Control knob 13 is secured to shaft 90 which is journalled in bearing structure 91. The knob 13 extends from the housing 7 and is adapted to cause rotation of bevel gear 92 which is secured at the other end of shaft 90. Gear 92 is meshed with another bevel gear 93 which is rigidly attached to yoke 94 as illustrated. Gear 93, however, is free to rotate about shaft 10. The yoke 94 and bevel gears 95, 96, 97 and 98 journalled therein provide the differential properties of the system. Gears 95 and 97 are respectively secured to stub shafts 99 and 100 which are journalled in yoke 94. Gears 96 and 98 are respectively secured to shafts 9 and 10, the latter being journalled in yoke 94 and extending through housing 7 to reels 1 and 2, respectively (Fig. 1). A spring 101 secured to a wall of housing 7, provides a frictional brake for the system, and is adapted to lock the system in position when pressed in firm contact with gear 92 by set-screw 102. A similar internal arrangement is present in housing 8, thereby providing means to brake shafts 9, 10, 11 and 12 to keep the strings 4, 5 and 6 tight in the neighborhood of reels 1, 2, and 3, respectively, in order that the position of the reels may indicate with reasonable accuracy the lengths of string paid out and in order that winding up of the reels may take place smoothly.

The strings 4, 5, and 6 are passed through guides or fairleads 17, 18, 19 respectively, which are adapted to be firmly located on a suitable chart to cause the said strings to act as if they issued out of selected base points on the chart representing the location of radio stations from which signals are received by a radio receiver, information from which is used for setting the knobs 13 and 14. Many forms of guides or fairleads are suitable for this purpose. In the drawings there are shown guides which, as suggested by my colleague L. E. Rovner, may conveniently be in the form of small highly magnetized permanent magnets having a channel or groove adapted to guide the strings, such channel or groove being narrow at one end in order to define a definite point of issuance for the strings, as shown on the drawing, where the edge of the channel is indicated by the dotted lines 17a, 18a and 19a. At the same time these channels may serve to form a division between opposite poles of the permanent magnets. A thin iron sheet may be placed immediately beneath the chart, or at least beneath that portion of the chart containing the base points, in order to act as an armature for the magnet. The strings may thus be held directly against the chart at the desired point without undue wear and tear on the chart. The location of the guides on the chart may be assisted by lightly drawing center lines, as for instance indicated at 20 and 21, intersecting at the base points.

The junction of the strings 4, 5 and 6 is to be provided in such a manner that the effective center of the junction may readily be referred to the chart or marked thereon and so that the strings are free to lead off in the direction of the respective base points. A simple method of arranging the junction of the strings 4, 5 and 6 is shown in the drawing and consists of a flanged eyelet 23 adapted to slide smoothly on the chart and adapted to hold in its circumferential groove a number of small rings, loops or eyes such as may conveniently be made of fine piano wire, to which the ends of the respective strings may readily be attached. An illustrative example of the eyelet 23 is shown in enlarged form in Fig. 4 indicating the manner in which the strings 4, 5, 6 and 25 are attached thereto. Four wire hoops 110, 111, 112 and 113 surround the eyelet and are arranged freely to slide in the peripheral groove of the eyelet, the strings 4, 5, 6 and 25 being respectively attached thereto by small loops. As a consequence of the free rotation of the hoops about the eyelet, the strings 4, 5, 6 and 25 tend to converge toward the center of the eyelet regardless of the direction of the respective base points from the eyelet. The eyelet is provided with an axial perforation 24 through which a suitable pricking or marking instrument may be inserted. The strings 4, 5 and 6 may thus be made to lie practically against the surface of the chart for their entire length during the use of the instrument of this invention. An additional eye is provided in the groove of the eyelet 23 for connection to a tension string 25, such connection being preferably made through a spring 26 fitted with a small tension indicator 27 of the general type used in simple spring scales. The string 25 may be attached to a suitable fixed point near the side of the chart opposite that at which the base points are located or, preferably, it may be connected to a suitable tension adjusting device, such as a small crank provided with a brake and adapted to be clamped or otherwise mounted on the board, table or other support for the chart at a location adapted for conveniently tightening the strings 4, 5 and 6 (as more fully explained in connection with Fig. 2). Such location is not critical.

As above mentioned, the strings 4, 5 and 6 are preferably made of a material having a very low degree of stretch. For this purpose the type of string used in drafting instruments, such as drawing boards with parallel rulers mounted thereon, is suitable. Although it is not necessary to conduct all plotting operations at the same tension, as indicated upon the device 27, the device 27 provides a convenient safeguard against overstretching the strings and is adapted to assure that each of the strings is reasonably tight. Operation of the instrument at standard tension on each string is not practical with a single tightening string 25, since the tension actually applied on each of the straings depends upon the angle between the respective strings and the string 25. If desired, more than one string 25, each provided with a device such as the device 27 and operating to apply tension to the string junctions may be used in order to equalize the tension on the various strings in the manner hereinafter described in connection with Fig. 2.

It is to be understood that the reel and differential mechanisms need not be located as close to the chart as suggested by the drawing, but may be mounted in any convenient place such as below the edge of the chart table or board, or elsewhere, the strings being led through suitable guides between the reel mechanism and the guides 17, 18 and 19, so that they may be readily unwound from the reels and yet kept tight over their entire length.

It will be seen that for different positions of the guides 17, 18 and 19, there will be different lengths of string between the respective guides and the respective reels. Compensation is generally to be provided for these differences in length, preferably by adjustment of the scales cooperating with the knobs 13 and 14 in a suitable calibrating operation. Such calibrating operation may be made either by locating the eyelet 23 so that its is over a point of known location with respect to the base points, the strings being maintained tight, and adjusting the scales cooperating with the knobs 13, 14 until the desired readings are obtained, or by drawing the eyelet 23 towards the central base point until it is located directly over the central base point (which may require a slight shift of the central guide 18 or else a special form of construction for such guide) and then setting the scales cooperating with the knobs 13 and 14 in accordance with the distance between the respective base points. This distance will normally have been determined in great accuracy and is likely to be well known to navigators. It can in any event be measured readily on the chart.

A great convenience of the apparatus of this invention is that it is extremely compact and therefore well suited for aerial navigation where working space may be at a premium. The guides 17, 18 and 19 may simply be removed from the chart and the strings 4, 5 and 6 wound up on their respective reels, leaving a very compact instrument only. It is to be understood that the representation of some portions of the instrument in the drawing has been somewhat spread out for purposes of illustration and that the shafts 9, 10, 11 and 12, need not be as long as shown and that the reels may be compactly associated with the differentials.

It may be desirable to maintain a certain amount of tension on the strings 4, 5, and 6 when the device is being put away in order that the strings may be wound firmly on the reels, and this may be readily achieved by following the procedure of first removing the guides 17, 18 and 19 from the chart, taking up the slack in the strings more greatly affected thereby, by manipulation of the knobs 13 or 14 and then gradually allowing the strings to be taken up upon their respective reels by release of the string 25. During such winding up of the reels the differentials may be operated to provide a reasonably even distribution of tension. When the device is completely wound up for putting away, the eyelet 23 may then rest against the guide 30 of the reel housing 2. The device 27 and the string 25 may be adapted for disconnection from the eyelet 23 at such time.

When the device is to be used again, the strings 4, 5 and 6 may be pulled out a convenient distance over the chart by means of the string 25, then placed in the respective guides 17, 18 and 19, the guides thereafter being fixed in place, and a suitable calibrating operation for the scales of the differentials 7 and 8 may then be carried through. No further calibrating operation should be necessary until the position of the guides 17, 18 and 19 is changed. In setting the position of the guides it may be convenient to set the position of the central guide first. Adjustment of the differentials may then be made as the guides 17 and 19 are moved into place. After the guides 17, 18 and 19 have been put in place, locating operations may be carried out either by setting the differentials 7 and 8 in accordance with information obtained from radio equipment and noting the eyelet position when the strings are tight or by moving the eyelet around with the differentials free except for spring action until the desired readings are obtained on the differentials, or by a combination of both techniques, such as first moving the eyelet about and then setting the knobs 13 and 14 at the desired readings and allowing the eyelet to find its place.

It is to be noted that the device (not shown) for fixing or pulling in the far end of the string 25 may conveniently be mounted on a sliding mount so that if it appears that to maintain the desired tension on the three strings it is necessary to move the eyelet 23 a considerable distance transversely with respect to the orientation of the string 25, the point of attachment or winding in of the string 25 may be shifted laterally accordingly. If several strings are used instead of a single string 25, arranged as in Fig. 2 and to be described hereinafter, the proper tightening of the strings 4 and 5 and 6 may simply be performed by tightening the several strings 25 to distribute the tension fairly evenly between them.

It is to be understood that the shafts of the knobs 13 and 14 are in principle interchangeable respectively with the shafts 9 and 12, so that the positions of the reels 1 and 3 may be respectively interchanged with the positions of the knobs 13 and 14 if this should be desirable from the point of view of mechanical compactness. If the differentials 7 and 8 are of the common crown gear and pinion type, however, connecting the reels 1 and 3 to the pinions would usually require additional gearing or adjusting of the relative diameter of the reels in order to preserve the desired 1:1 ratio for the winding and unwinding of the strings. With a bevel gear design of the differentials (as shown in Fig. 3) this last difficulty may be avoided.

Instead of the reels 1, 2 and 3 other equivalent mechanical arrangements may be used for paying out the strings 4, 5 and 6 at a uniform rate while maintaining a constant difference between the respective lengths of string paid out in the case of each of the three strings. For instance, the particularly simple mechanical arrangement shown in Fig. 2 might be used. The arrangement shown in Fig. 2 does not possess the advantage of compactness to the degree to which this advantage is possessed by the reel type of mechanism shown in Fig. 1, but it may have advantages in its mechanical simplicity and its "foolproof" construction.

In Fig. 2 is shown a chart 35 mounted on a board or table 36. The adjustable guides 37, 38 and 39 correspond to the guides 17, 18 and 19 of Fig. 1. The strings or strands 44, 45 and 46 likewise correspond to the strings or strands 4, 5, and 6 of Fig. 1. The position-locator eyelet 43 corresponds to the eyelet 23 of Fig. 1 which is more clearly illustrated in Fig. 4. Instead of the single tightener string 25 of Fig. 1 there are shown in Fig. 2 two tightener strings 47 and 48. The devices 49 and 50 interposed between the eyelet 43 and the respective tightening strings 47 and 48 are of the form and serve the function of the device 27 of Fig. 1. The strings 47 and 48 may be respectively tightened by the devices 51 and 52, which are simple winding in devices adapted to be clamped at suitable positions on the board 36. These devices may be so arranged that by axial shifting of the crank a brake may be brought into action to preserve the adjustment. For convenience of illustration, the devices 51 and 52 have been shown extending above the surface of the board.

In the apparatus of Fig. 2, the relative effective lengths of the strings 44, 45 and 46, which operate to determine the location of the eyelet 43, are determined by the position of two rack bars 54 and 56. The string 44 is connected to the upper end of the rack bar 54 and the string 46 is connected to the upper end of the rack bar 56. The vertical position of the rack bars is controlled by pinions 57 and 58 engaging the rack teeth and mounted in a sliding frame 59 which is vertically slidable on the guide rails 60 and 61. The string 45 is simply fastened to a convenient point of the frame 59, preferably one so located that the string 45 does not differ too greatly in length from the strings 44 and 46.

The strings 44, 45 and 46 pass respectively over the guides 64, 65 and 66 at the edge of the board 36 before proceeding to the adjustable guides 37, 38 and 39. The guides 64, 65 and 66 may be of any suitable form, either suitably shaped notches, waxed or covered with metal if desired, or guides of the grooved-roller type.

The vertical alignment of the rack bars 54 and 56 and the engagement of the rack bars with their respective pinions may be preserved by suitable auxiliary rollers such as the rollers 67 and 68, or by equivalent guides. If desired, pinions might be provided on both sides of each rack bar and driven simultaneously through suitable gears in order to provide a more friction-free engagement. As shown in Fig. 2, the pinions 57 and 58 are geared through the respective coaxial pinions 69 and 70 to the larger gear wheels 71 and 72, which are provided with dials marked with suitable scales. The dial gears 71 and 72 may be controlled directly by knobs 73 and 74 respectively or they may be controlled for purpose of fine adjustment by means of the knobs 75 and 76, respectively, which are connected to the respective dial gears through suitable gear engagements.

Adjustable index segments 77 and 78 are provided for determining and adjusting the reference points of the dial scales. The index segments 77 and 78 are adjustable about the axis of the gears 71 and 72 respectively and it is contemplated that they should be adjusted after each change of the positions of the guides 37, 38 and 39, in accordance with a calibration operation such as that described above in connection with Fig. 1. The adjustment of the segments 77 and 78 as determined by the calibration operation may be preserved by means of setting devices 79 and 80, which may be simple set-screws.

In the apparatus of Fig. 2 there is practically no problem in maintaining tension on the strings 44, 45 and 46 because the weight of the frame 59 and of the rack bars 54 and 56, being suspended respectively on the strings 44, 45 and 46, will tend to keep the respective strings tight. If desired, additional weights may be attached to the rack bars 54 and 56 in order to equalize the tension as compared with the tension of the string 45. The absence of reels makes it relatively unimportant to maintain the tension during the various stages of the procedure and the fact that these strings are extended entirely in straight spans may increase the accuracy of the differential length adjustments. The strings may be of equal length and of similar stretching properties so that the effect of stretch will cancel out except for such slight inequalities as may occur from differences of tension resulting from the different positions of the guides 37, 38 and 39.

It is to be noted that the board 36 need not be horizontal but may be vertical so that the entire apparatus may be mounted on a wall and therefore need not occupy a great volume of space in spite of the desirability of a fairly considerable length of travel for the frame 59 on the guide rails 60 and 61.

It is to be understood that if any of the devices here considered is to be adapted for locating position over a relatively large area, suitable gearing may be provided between the knobs 13 and 14 and the respective differentials 7 and 8 controlled by them and suitable methods of indication of the positions of the differentials may be employed, such as a small and a large scale, the scale having the greater range being connected to the more slowly moving member and the scale providing the finer range being connected to the relatively faster moving member. These scales may be calibrated in respect to a standard chart scale either in terms of distance or in terms of such units as may be provided by the radio equipment operating upon the difference of the time of arrival of synchronized signals from known base stations. If desired, multiple scales may be provided for use with charts drawn to different scales.

What is claimed is:

1. Apparatus for plotting on a chart the intersection of hyperbolic arcs having one common focus, which apparatus includes first, second and third reels, differential control apparatus connected between said first and second reels and between said second and third reels for controlling the respective relative positions of said first reel with respect to said second and third reels, three strands joined together at a junction at one end and respectively wound on said reels at the other end, three guides for said respective strands positioned on said chart, each of said guides fixing a location for the termination of a span of one of said strands extending toward said junction, a position-indicating means connected to said strands at said junction, means arranged to draw said junction and said position-indicating means away from said guides and means for providing tension on said three strands.

2. Apparatus for plotting on a chart the intersection of hyperbolic arcs having one common focus, which apparatus includes three reels, differential control apparatus connected to each of said reels between one of said reels and each of the others thereof for controlling the respective relative positions of said last-mentioned reels with respect to said first-mentioned reel, three strands joined together at one end to form a junction and respectively wound to said reels at the other end, means for adjustably limiting the travel of said differential control means, said means including a scale and means for adjusting the position of said scale for purposes of calibration, three guides for said respective strands positioned on said chart, each of said guides fixing a location for the termination of a span of said strands extending toward said junction, a position-indicating means associated with said strands and at said junction, at least one additional strand adapted to draw said junction and said position-indicating means away from said guides.

3. Apparatus for plotting on a chart the intersection of hyperbolic arcs having one common focus, which apparatus includes three reels, differential control apparatus connected to each of said reels between one of said reels and each of the others of said reels and for controlling the respective relative positions of said last-mentioned reels with respect to said first-mentioned reel, three strands joined together at a junction at one end and respectively wound on said reels at the other end, three guides for said respective strands positioned on a chart, each of said guides fixing on said chart a location for the termination of a span of one of said strands extending towards said junction, a position-indicating means associated with said strands at said junction, an additional strand arranged to draw said junction and said position-indicating means away from said guides and means associated with said additional strand for causing said additional strand to draw said junction.

4. Apparatus for plotting on a chart the intersection of hyperbolic arcs having one common focus, which apparatus includes three reels, differential control apparatus connected to each of said reels between one of said reels and each of the other of said reels for controlling the respective relative positions of said last-mentioned reels with respect to said first-mentioned reel, three strands joined together at one end at a junction and respectively wound on said reels at the other end, three guides for said respective strands positioned on said chart and each fixing a location for the termination of a span of one of said strands extending towards said junction which location is substantially invariant for a variety of directions of said strand span, a position-indicating means associated with said strands at said junction, at least one additional strand connected to said junction to draw said junction and said position-indicating means away from said guides, tension indicating means associated with said additional strand and means for providing tension on said first-mentioned three strands.

5. Apparatus for plotting positions on a chart in accordance with information relating to the time difference in the reception of signals from different radio stations, which apparatus includes three reels, differential control apparatus connected to each of said reels between one of said reels and each of the others of said reels for controlling the respective relative positions of said last-mentioned reels with respect to said first-mentioned reels, three strands joined together at one end to form a junction and respectively wound on said reels at the other end, three guides for said respective strands positioned on said chart and fixing a location for the termination of a span of one of said strands extending towards said junction which location is substantially constant for a variety of directions of said strand span, a flanged eyelet having an axial perforation providing a junction for said strands having an effective center at said axial perforation and providing said junction by loops attached to said strands passing around said eyelet, at least one additional strand connected to said eyelet for drawing said eyelet and said junction away from said guides and means for providing tension on said first-mentioned three strands.

6. Apparatus for plotting the intersection of two hyperbolic arcs having a common focus, which apparatus includes three guides each having an opening therethrough, said guides being positioned respectively at said common focus and the two other foci of said hyperbolic arcs, three inextensible strands respectively passing through the openings in said guides, an eyelet having loops extending from the periphery thereof and having also an axial perforation, one end of said strands being secured to said loops to provide an effective junction at said axial perforation, differential control apparatus connected to the other end of said strands for adjusting the length of said strands in a desired manner, and means secured to said eyelet for normally urging said eyelet away from said guides and providing tension on said three strands.

7. Apparatus for plotting on a chart the intersection of two hyperbolic arcs having a common focus, which apparatus includes three guides positioned on said chart respectively at said common focus and the other two foci of said hyperbolic arcs, three inextensible strands respectively passing through said guides, means joining said strands at one end thereof whereby all the strands at the juncture tend to converge at a single point regardless of the angle at which said strands approach the juncture, three reels being differentially coupled together, said strands being respectively coupled at the other end to said reels, and anchored spring means secured to said strand joining means normally urging said juncture away from said guides and providing tension on said three strands.

8. Apparatus for plotting on a chart the intersection of two hyperbolic arcs having a common focus, which apparatus includes three guides respectively secured to said chart at said common focus and the other two foci of said hyperbolic arcs, first, second and third reels, first and second differential gear means respectively coupled between said first and second and said second and third reels, calibrated control means operatively associated with said differential gear means for controlling the relative rotary position of said first reel with respect to said second and third reels, three inextensible strands respectively passing through said guides, means joining said strands at one end thereof to form a junction, the other end of said strands being respectively wound on said first, second and third reels, and anchored spring means secured to the junction of said strands normally urging said junction away from said guides and providing tension on said three strands.

9. Apparatus in accordance with claim 6 wherein said last-mentioned means comprises a plurality of anchored spring means arranged to exert forces on said eyelet in directions to maintain substantially equal tension on each of said strands regardless of the position of said eyelet relative to said guides.

10. Apparatus for plotting on a chart the intersection of two hyperbolic arcs having a common focus comprising, a table on which said chart is adapted to be mounted, three guides each having an opening therethrough, said guides being positioned respectively at said common focus and the two other foci of said hyperbolic arcs, three inextensible strands respectively passing through the openings in said guides, an eyelet having loops extenidng from the periphery thereof and having also an axial perforation, one end of each of said strands being secured to said loops to provide an effective junction at said axial perforation, spring means anchored to said table and secured to said eyelet for normally urging said eyelet away from said guides and providing tension on said three strands, and differential control apparatus connected to the other end of said strands for adjusting the length of said strands in a desired manner.

11. Apparatus in accordance with claim 10 wherein said differential control apparatus comprises a pair of guide rails depending from said table, a frame vertically slidable on said guide rails, a pair of pinions mounted on said frame, a pair of rack bars vertically movable within said frame and respectively engaged by said pinions, and means securing said other end of said strands one each to said rack bars and said frame.

12. Apparatus in accordance with claim 10 wherein said table is horizontally disposed and said differential control apparatus comprises, a pair of guide rails vertically depending from an edge of said table, a frame mounted between said guide rails for vertical movement thereon, a pair of rack bars mounted within said frame and arranged for vertical movement therein, a pair of pinions positioned within said frame and respectively engaging said rack bars, means secured to each of said pinions for controlling and indicating the rotation thereof, and means securing said other end of said strands one each to said rack bars and said frame.

13. Apparatus for plotting on a chart the intersection of two hyperbolic arcs having a common focus comprising, a horizontally disposed table on which said chart is adapted to be mounted, first, second and third guides, each having an opening therethrough, means respectively securing said guides at said common focus and the other two foci of said arcs, first, second and third inextensible strands respectively passing through the openings in said first, second and third guides, an eyelet having a plurality of loops extending from the periphery thereof and having also an axial perforation, one end of each of said first, second and third strands being secured to one of said loops to provide an effective junction at said axial perforation, a pair of tightening strands including springs anchored at one end at one edge of said table and secured at the other end to one of said plurality of loops and arranged to normally urge said eyelet away from said guides, and differential control apparatus connected to the other end of said first, second and third strands for adjusting the length of said strands at the same rate, said differential control apparatus comprising, a pair of guide rails vertically depending from the edge of said table opposite from said one edge, a frame mounted between said guide rails for vertical movement thereon, first and second rack bars mounted within said frame and guided for vertical movement therein, first and second pinions positioned within said frame and respectively engaging said first and second rack bars, means secured to each of said pinions for controlling and indicating the rotation of each of said pinions, and means securing said first strand to said frame and said second and third strands to said first and second rack bars, respectively.

14. Plotting apparatus comprising three spaced guides located in a plane, three strands respectively passing through said guides, an eyelet having a plurality of loops extending from the periphery thereof and having an axial perforation, one end of each of said strands being secured to one of said loops to provide an effective junction at said axial perforation, said eyelet also being disposed in said plane, means secured to the other end of said strands for adjusting the length of said strands at the same rate, and means secured to said eyelet for normally urging said eyelet away from said guides and providing tension on said strands.

WM. REDIN WOODWARD.

REFERENCES CITED

The following references are of record in the file of this patent:

UNITED STATES PATENTS

| Number | Name | Date |
|---|---|---|
| 2,385,827 | McKaba | Oct. 2, 1945 |
| 2,493,786 | Swift | Jan. 10, 1950 |

FOREIGN PATENTS

| Number | Country | Date |
|---|---|---|
| 16,316 | Great Britain | 1915 |
| 176,676 | Great Britain | Mar. 16, 1922 |